United States Patent Office 3,201,410
Patented Aug. 17, 1965

3,201,410
CERTAIN 3-ARYL-2,4-OXAZOLIDINE DIONE COMPOUNDS
Georges Morel, Versailles, Yves Menoret, Montreuil-sous-Bois, and Robert Levy and Oleg Gryszkiewicz-Trochimowski, Vert-le-Petit, France, assignors to French State represented by the Minister of Armed Forces, Powder Department, and Institut National de la Recherche Agronomique, both of Paris, France, both French Government offices
No Drawing. Filed Nov. 17, 1958, Ser. No. 774,107
Claims priority, application France, Nov. 20, 1957, 752,044
4 Claims. (Cl. 260—307)

Our invention has for its object the utilization, as agents adapted to act on the growth of plants, of chemical substances of which a number are already known per se, while others are new.

Our invention covers also a method for producing said substances, whether already known or new.

Our invention has for its object the new substances as novel articles of manufacture, together with their industrial or agricultural applications.

The substances obtained according to our invention are constituted by substituted oxazolidine-diones-2,4 and also substituted thiazolidine-diones-2,4-characterized by the following basic structure:

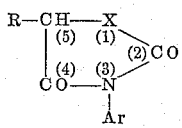

wherein X is a member selected from the group consisting of sulphur and oxygen, R designates hydrogen or an aliphatic hydrocarbon radical with a straight or branched chain including one to 18 atoms of carbon, whether substituted or otherwise, or else an aromatic nucleus, whether substituted or otherwise, or again an aliphato-aromatic chain in the case of the aliphatic hydrocarbon radical, the preferred aliphatic group is constituted by methyl or ethyl or again we may resort to cyclo-hexyl, benzyl or the like. As to Ar, in the above structural formula, it designates an aromatic or heterocyclic nucleus, wherein one or more or all the hydrogen atoms may be individually substituted in any desired combination, in particular by one or more halogens or alkyl, alkoxy or nitro the preferred halogen being chlorine. In the above formula, the atom of oxygen at 1 may, furthermore, be replaced by an atom of sulphur.

Among the substances of the above categories, some are already known per se, and in particular those where Ar is a phenyl radical and R is methyl, ethyl, isopropyl or phenyl radical; said substances have been described in the following publications: Lambling (Bull. Soc. Chim., 19,780 (1898); (3), 27,449, 606, 871 (1902); (3), 29, 128 (1903) and Rekker, R. F., Faber, A. C., Tom, D. H. E., Verleur, H., and Nauta, W. T. (Rec. Trav. Chim. Pays-Bas, 70,113 (1951).

However the methods for preparing such substances disclosed in said publications do not allow obtaining said substances on an industrial scale. Thus, for instance in the above-mentioned paper published by Rekker in 1951, the method for preparing said substances resorted to a solution in ether which led to extremely low yields.

Our invention has consequently for its chief object a general method of production of the above mentioned substances, which method allows obtaining in all cases very important yields.

According to our invention, we cause an aromatic or hetero-cyclic isocyanate to react with an alkyl ester, preferably the ethyl ester of an acid containing a secondary alcoholic group in an alpha position with reference to the acid group. The isocyanate should correspond to the product which it is desired to obtain and the ester may be constituted for instance by ethyl lactate, ethyl alpha-oxy-butyrate, ethyl alpha-oxy-stearate, ethyl mandelate, the reagents being incorporated in equimolecular amounts in a solvent the boiling point of which is higher than that of the alcohol formed by the ester during reaction, said solvent not being capable of reacting with isocyanate; the reaction is preferably performed in the presence of a catalyst constituted for instance by traces of metallic sodium, the reaction chamber being heated to a temperature such that said alcohol is evolved through boiling, which may be obtained in practice by resorting to a distillation column and communicating with the reaction vessel and being adjusted in a manner such that the temperature at the upper end of the column is maintained at or above the boiling point of the alcohol formed by the ester during reaction.

Among the solvents which may be used, we may mention particularly toluene, but it is also possible to resort to the following products:

Chlorobenzene: B.P. 132° C.
Decalin: B.P. 185° C.
Xylene: B.P. 139° C.
Heptane: B.P. 99° C.
n-Butyl ether: B.P. 142° C.
n-Butyl acetate: B.P. 124° C.

Our improved method allows thus removing the alcohol as it is being formed, which allows obtaining pure products with excellent yields.

Thus, it has been possible to prepare in the manner disclosed the products corresponding to oxazolidine-diones-2,4-substituted at 3 and at 5 and of which the melting points are given hereinafter in centigrade degrees with their substituents.

| Substituent at 3 | Substituent at 5 | Melting point, ° C. |
|---|---|---|
| Phenyl | Methyl | 141 |
| o-Chloro phenyl | do | 83 |
| m-Chloro phenyl | do | 65 |
| p-Chloro phenyl | do | 171 |
| Dichloro-2,4 phenyl | do | 89 |
| Dichloro-3,4 phenyl | do | 156 |
| Dichloro-2,5 phenyl | do | 149 |
| (Methoxy-2 chloro-5) phenyl | do | 134 |
| Trichloro-2,4,5 phenyl | do | 132 |
| Trichloro-2,4,6 phenyl | do | 97 |
| Alpha-naphthyl | do | 127 |
| Beta-naphthyl | do | 148 |
| Phenyl | Ethyl | 88 |
| m-Chloro phenyl | do | 65 |
| p-Chloro phenyl | do | 93 |
| Beta-naphthyl | do | 110 |
| Phenyl | Isopropyl | 66 |
| p-Chloro-phenyl | do | 112 |
| Phenyl | Phenyl | 123 |
| m-Chloro phenyl | do | 148 |
| p-Chloro phenyl | do | 156 |
| Dichloro-2,4 phenyl | do | 150 |
| Trichloro-2,4,5 phenyl | do | 110 |

The above list is by no means given in a restrictive manner and it is possible, as already mentioned, to use numerous substituents in accordance with the invention defined in the accompanying claims.

We will now disclose by way of a mere exemplification a few examples of the preparation of the above-mentioned substances.

*Example 1*

We heat under reflux conditions during three hours inside a flask capped by a distilling column of a length of about 60 cm. connected with a downward cooler a mixture constituted by:

| | | |
|---|---|---|
| Ethyl lactate | gr | 59 |
| Phenyl isocyanate | gr | 60 |
| Toluene | cm.³ | 250 |
| Metallic sodium | gr | 1 |

It is also possible to use at the top of the column a reflux head which allows a complete separation between the alcohol and the toluene.

We maintain at the upper end of the column a temperature of 76 to 78° C. which allows recovering about 60 cc. of the liquid mixture of alcohol and toluene. After three hours, the temperature is allowed to rise up to 106 to 108° C. There are then added into the flask 50 cc. of toluene and 40 cc. of liquid are distilled off. The temperature at the upper end of the column is then equal to 109 to 111° C.

After cooling, the toluene solution is stirred with 100 cc. of water, so as to dissolve the sodium salts formed therein, after which the solution is caused to settle and the toluene-containing layer is dried through the agency of calcium chloride and the major part of the toluene is distilled.

Upon cooling, the phenyl - 3 - methyl-5-oxazolidine-dione 2,4 obtained crystallizes. We obtain thus 60 gr. of a substance melting at 140–141° C. with a yield of 77%.

*Example 2*

We heat under reflux conditions during three hours in a flask capped by a distilling column, the length of which is equal to 60 cm. and which is connected with a downward cooler, a mixture constituted by:

| | | |
|---|---|---|
| Ethyl lactate | gr | 59 |
| p-Chlorophenyl isocyanate | gr | 76 |
| Toluene | cm.³ | 250 |
| Metallic sodium | gr | 1 |

The mixture is then heated and the operation continues as in the case of Example 1, except for the fact that the major part of the toluene is driven out directly. After cooling, the p-chlorophenyl-3-methyl-5-oxazolidine-dione 2,4 obtained crystallizes, after which it is drained, and washed with water in a Büchner flask for removing the water-soluble sodium salts. The rough product thus obtained melts at 173° C. The yield is equal to 86 gr. corresponding to 83% of theory. After further crystallization in ethanol, the substance obtained melts at 174° C. to 175° C.

*Example 3*

We heat under reflux conditions during three hours as in the case of Examples 1 and 2:

| | | |
|---|---|---|
| Ethyl alpha oxy butyrate | gr | 65 |
| p-Chlorophenyl isocyanate | gr | 76 |
| Toluene | cm.³ | 250 |
| Metallic sodium | gr | 1 |

The substance obtained is washed in a Büchner flask after driving out the major part of the toluene, said substance being constituted by p-chlorophenyl-3-ethyl-5-oxazolidine-dione 2,4 and melting at 76° C. The yield is 73 gr. corresponding to 72% of theory. A further recrystallization in acetone and petroleum ether produces a final substance melting at 93° to 93.5° C.

*Example 4*

The following mixture is heated under reflux conditions during three hours as in the preceding examples:

| | | |
|---|---|---|
| Ethyl mandelate | gr | 17 |
| Trichloro-2,4,5 phenyl isocyanate | gr | 22.5 |
| Toluene | cm.³ | 70 |
| Metallic sodium | gr | 0.3 |

The substance obtained is washed in a Büchner flask after driving out the major part of the toluene and the substance obtained constituted by trichloro-2',4',5' phenyl-3-5-oxazolidine-dione-2,4 melts at 106 to 107° C. The yield is 30 gr. corresponding to 86% of theory. A further crystallization in alcohol leads to a substance melting at 110° C.

As already mentioned hereinabove, it is found that the above-defined substances show all to a varying extent regulating properties for vegetable growth and the use of such regulating substances forms one of the features of our invention.

Said properties are as follows:

(1) These substances from herbicidal products operating through contact; in particular, those substances in which R is an alkyl chain and Ar a benzenic nucleus provided with a single halogen atom substituted in a para position show a phytotoxic action having a certain specificity which allows considering them as forming part of the category of herbicidal products adapted to be used for agricultural purposes before or after the shooting of the plants above ground. In particular, we may mention, by way of example, the following, without this being given in a limiting sense:

Para-chlorophenyl-3-ethyl-5-oxazolidine-dione-2,4 when atomized and dissolved at a concentration of 1 in 1,000 parts of water produces a large necrosis on wheat and corn plantlets and destroys tomato plantlets. Para-chlorophenyl-3-isopropyl-5-oxazolidine-dione-2,4 has a similar action under similar conditions. At a concentration of 0.5 part per 1,000, of a solvent such as water, it still destroys tomato plantlets without any toxicity for wheat and corn plantlets.

Tests made on experimental plots of land have been executed through atomization of such substances in the form of aqueous suspensions obtained through the agency of a tensio-active reagent such as that sold under the name of Tween 80. They allow stating that the derivatives of this family of substances bestowed with such a contact action form complete herbicides when used in amounts ranging between 5 and 15 kg. per hectare while destroying selectively the adventitious broad-leaved plants in cereal fields in amounts ranging btween 2 and 5 kg. per hectare.

(2) The substances referred to form growth regulators of the same type as maleic hydrazine. In particular, the substances containing an alkyl group at R and wherein Ar is a benzenic group containing a single halogen atom in a meta or ortho position or else a non-halogenated benzenic group form complete inhibitors for the growth of vegetables to which they are applied through atomization or sprinkling thereon. In said case, no necrosis appears so that the plant does not die. The leaves retain their normal shape and behaviour and their color is merely shifted to a darker green shade. In certain cases, the inhibition of the terminal bud leads to the development of lateral buds whereby the morphological character of the plant is completely changed. By way of indication, we may disclose in a non-limiting illustrative manner the following examples:

Phenyl-3-methyl-5-oxazolidine-dione-2,4 atomized and dissolved at a concentration of 1 part per 1,000 stops the growth of wheat and corn plantlets, but has no action on beans (*Phaseolus vulgaris*) or on peas (*Pisum sativum*). Under similar conditions, metachlorophenyl-3-methyl-5-oxazolidine-dione-2,4 has a growth-inhibiting action on peas, corn and wheat while parachlorophenyl-3-methyl-5 oxazolidine-dione-2,4 is toxic neither for peas, nor for wheat, but it acts as an inhibitor for groundsel (*Senecio vulgaris*).

The selectivity of this type of derivatives allows using them for cleaning crops of leguminous plants and, in particular, of peas and beans and they may also be used for delaying the growth of greens and lawns.

(3) Various compounds of this novel category of substances wherein R designates and alkyl group carrying one or more atoms of carbon, while Ar is constituted by an aromatic nucleus into which one or more chlorine atoms are substituted show a highly remarkable morphogenic action. When one of said substances is applied to certain plants through atomization or through sprinkling, there is observed about one month after the treatment transformation in the leaves which change the appearance of the plant to a point such that it is no longer recognizable. In the case of *Chelidonium majus,* a number of leaves become extremely laciniated, while their limb is reduced substantially to zero, and other leaves on the contrary are reduced to a single foliole of which the limb is extremely developed.

(4) Numerous substances according to our invention have for their action a removal of the leaves and, after atomization of such substances, there is obtained a speedy dropping of the leaves or flowers in accordance with the usual procedure, i.e., the formation of an intermediate blade at the inner end of the petiole or on the stalk. Said action has been remarked in the case of holly, peach trees, cotton, these being mere examples which are by no means exclusive of others and said action may be resorted to in fact with a view to furthering the gathering of cotton.

(5) The substances referred to have an action on the formation of flowers of certain species and lead to the development and production of flowers of such plants in the shape of a rose, without requiring any special periodical photo-effect or thermo-effect. The substances referred to are actually novel products acting as growth-developing substances and they may, in this respect, be compared with giberelline.

(6) Numerous compounds obtained according to our invention have a great mutoclasic and mutagenic activity. They produce a fractionation of the chromosomes in the cells which are about to be subdivided and they are capable of producing mutations in the gemma.

Obviously, many modifications may be brought to the method disclosed hereinabove and to the range of products obtained, within the scope of the accompanying claims. In particular, it is possible to use mixtures of two or more of the above-mentioned substances or else they may be used in admixture with other substances.

Furthermore and as already mentioned hereinabove, the new substances discovered may, according to the invention, be used as they are for many industrial applications, in addition to those described hereinabove.

What we claim is:

1. A chemical growth-controlling substance for plants constituted by parachlorophenyl 3-ethyl 5-oxazolidine dione 2,4.

2. A chemical growth-controlling substance for plants constituted by parachlorophenyl 3-isopropyl 5-oxazolidine dione 2,4.

3. A chemical growth-controlling substance for plants constituted by parachlorphenyl 3-methyl 5-oxazolidine dione 2,4.

4. A chemical growth-controlling substance for plants constituted by orthochlorophenyl 3-methyl 5-oxazolidine dione 2,4.

References Cited by the Examiner
UNITED STATES PATENTS

| | | | |
|---|---|---|---|
| 2,856,277 | 10/58 | Bluestone et al. | 71—2.5 |
| 2,865,730 | 12/58 | Gates et al. | 71—2.5 |
| 2,866,734 | 12/58 | Shapiro et al. | 260—307.3 |
| 2,928,840 | 3/60 | Shapiro et al. | 260—307.3 |
| 3,046,281 | 3/60 | Shapiro et al. | 260—307 |

OTHER REFERENCES

Elderfield, Heterocyclic Componunds (Wiley), vol. 5, page 413, 713 (1957).

Groggins, Unit Processes in Organic Synthesis (New York, 1947), pages 627–634 and 637–638.

Lambling, Bull. Soc. Chim. France (3) vol. 19, page 780 (1898).

Lambling, Bull. Soc. Chim. France (3) vol. 27, pp. 444–449 (1902).

Lambling, Bull. Soc. Chim. France (3) vol. 29, pp. 122–128 (1903).

Rekker et al., Rec. Trav. Chim. Pays-Bas, vol. 70, pp. 113–126 (1951).

NICHOLAS S. RIZZO, *Primary Examiner.*

JOHN D. RANDOLPH, *Examiner.*